United States Patent
Hall et al.

[19]

[11] Patent Number: 5,934,220
[45] Date of Patent: Aug. 10, 1999

[54] TEAT LOCATION FOR MILKING

[75] Inventors: Robert Christopher Hall, Welwyn; Stephan Robert Lee; Diane Susan Spencer, both of Flitwick; Michael John Street, Bedford, all of United Kingdom; Jan Stein, Älvsjö; Benny Örnerfors, Järfälla, both of Sweden

[73] Assignee: Alfa Laval Agri AB, Sweden

[21] Appl. No.: 09/065,108

[22] PCT Filed: Oct. 28, 1996

[86] PCT No.: PCT/SE96/01381

§ 371 Date: Jun. 18, 1998

§ 102(e) Date: Jun. 18, 1998

[87] PCT Pub. No.: WO97/15900

PCT Pub. Date: May 1, 1997

[30] Foreign Application Priority Data

Oct. 27, 1995 [SE] Sweden ................................. 9503792

[51] Int. Cl.[6] ............................... A01J 5/017; A01J 5/02; A01J 5/04
[52] U.S. Cl. ....................................... 119/14.08; 119/14.18
[58] Field of Search ............................. 119/14.08, 14.18

[56] References Cited

U.S. PATENT DOCUMENTS

| | | | |
|---|---|---|---|
| 4,223,635 | 9/1980 | Akerman | 119/14.02 |
| 4,805,557 | 2/1989 | Van Der Lely et al. | 119/14.08 |
| 4,867,103 | 9/1989 | Montalescot et al. | 119/14.08 |
| 5,042,428 | 8/1991 | Van Der Lely et al. | 119/14.08 |
| 5,211,132 | 5/1993 | Farina et al. | 119/664 |
| 5,379,721 | 1/1995 | Dessing et al. | 119/14.08 |
| 5,784,994 | 7/1998 | Van Der Lely | 119/14.08 |
| 5,791,284 | 8/1998 | Van Der Lely | 119/14.08 |
| 5,865,138 | 2/1999 | Van Der Lely | 119/14.02 |

FOREIGN PATENT DOCUMENTS

| | | | |
|---|---|---|---|
| 0306579 | 9/1987 | European Pat. Off. | 119/14.08 |
| 4113700 A1 | 10/1992 | Germany | 119/14.08 |
| 2192351 | 1/1988 | United Kingdom. | |

OTHER PUBLICATIONS

Sheet–of–Light Range Imaging, Linkoping Studies in Science and Technology, Thesis No. 404 Mattias Johannesson, Nov. 1993.

*Primary Examiner*—Michael J. Carone
*Assistant Examiner*—James S. Bergin
*Attorney, Agent, or Firm*—Melvin I. Stoltz

[57] ABSTRACT

A method of guiding a milking apparatus support towards at least one teat of a milk animal, characterized in that the method comprises the following steps: moving a support to a fixed start position within a stall; illuminating a region expected to contain at least one udder with a sheet of light from the support; capturing images by viewing the region with a video camera; analyzing the captured images to identify possible teat candidates and selecting one of these teat candidates as a target teat; determining the position of the target teat and homing in the support and any supported milking apparatus to the target teat.

28 Claims, 6 Drawing Sheets

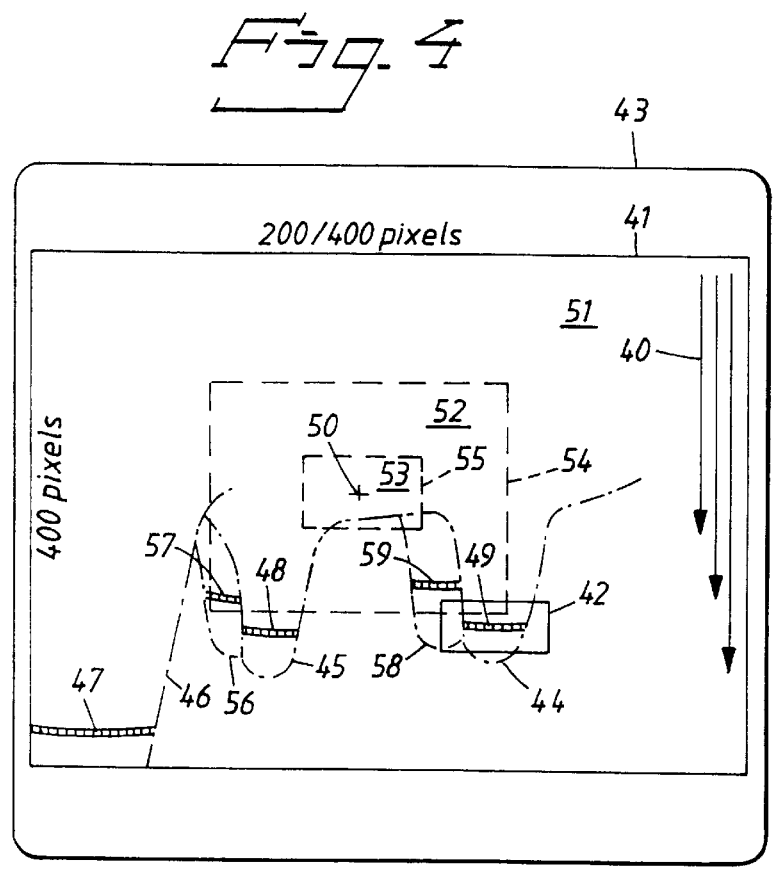
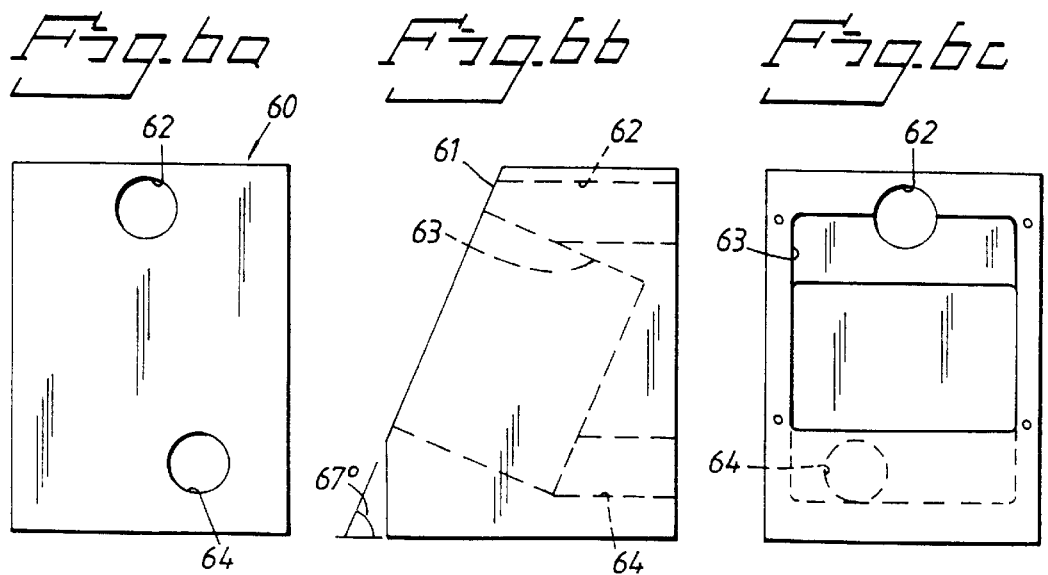

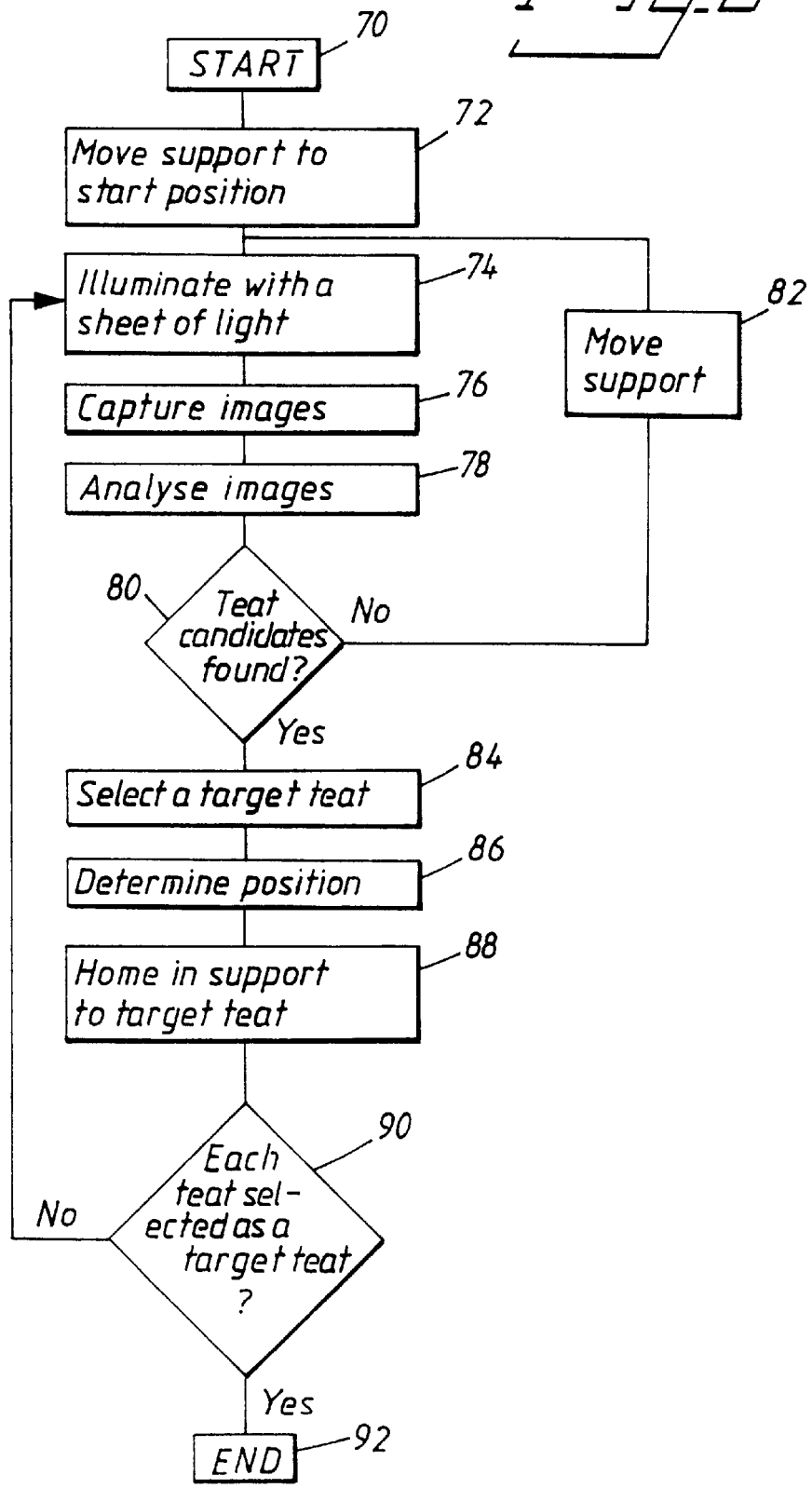

TEAT LOCATION FOR MILKING

TECHNICAL FIELD OF THE INVENTION

The present invention relates to a method of guiding a milking apparatus support towards a teat of a milk animal and a milking apparatus support guide arrangement.

DESCRIPTION OF RELATED ART

Over some twenty to thirty years, numerous proposals have been made for techniques by which a milking apparatus, defined as including a teat cup connected to a milking machine, a teat cleaning device and a teat examination device, can be applied to a teat of a milk animal, such as a cow, by automatic means so as to avoid the need for attendance by an operator during the procedure of milking an animal.

As automatic techniques for the rest of the milking procedure have been available for some time, automation of the teat cup application stage has become the main obstacle to the development of a fully-automatic milking procedure which does not require continuous attendance and enables the so-called "milking on demand" regime.

For many reasons, e.g. animal safety and comfort, milk hygiene and economic efficiency, the application stage has to be extremely reliable. That is a teat cup must be quickly and correctly applied to a teat on every occasion when an animal presents for milking. Also, the equipment to carry out the application stage has to work in difficult conditions and must be durable while not being too expensive.

EP-A-306 579 discloses a combination of a general sensor and local sensor to guide a teat cup onto a teat. The general sensor is mounted alongside the stall and projects a sheet of light derived from a laser towards the region where the udder and teats of an animal in the stall for milking will be present. The sheet of light is incident on an udder and teats when present and produces lines of light on the udder and teats. The sheet of light can be swept through the region to an appropriate position. A camera is mounted as part of the sensor and forms an image of the lines. The image includes discontinuous lines for the teats where illuminated by the sheet of light. These lines are analysed in a control arrangement so as to find the position of the teat(s) and calculate coordinates by triangulation for two horizontal axes and a vertical axis. Reference values for the coordinates stored in the control arrangement assist in analysis by limiting the search and calculation time. The calculated coordinates are used to bring the local sensors in range of a teat. Knowledge of the reference coordinates may be used to limit the image analysis to the part of the image where the teats are expected to be found, thereby reducing the calculation time.

This disclosure has the disadvantage that two sensors are needed and that one has to be mounted alongside the stall in an exposed position.

SUMMARY OF THE INVENTION

It is an object of the invention to provide an improved teat location technique for automatic milking procedures, which can provide the complete teat location process.

According to the invention, there is provided a method of guiding a milking apparatus support towards at least one teat of a milk animal, characterized in that the method comprises the following steps:

to move said support to a fixed start position within a stall, without any reference to any animal, to illuminate with a sheet of light from the support a region expected to contain one udder, to capture from said support images by viewing the region with a video camera, to analyse said captured images to identify possible teat candidates, to select one of said teat candidates as a target teat, to determine the position of said target teat, and to home in said support and any supported milking apparatus to said target teat.

The main advantage with the method according to the present invention is that it does not require the use of so called historical data regarding the teat positions of the animal individualas. The animals do not need to be placed in special stalls with tight constraints. They are free to move within the limits of the stall.

Advantageously, the method, subsequently to selecting a target teat, comprises the step:

to analyse only a subimage of said captured image, which subimage includes said target teat. Hereby, the speeding up of the method is achieved.

Preferably, the method also comprises the following steps:

to provide in said captured image the position of a teat cup entry point for a target teat, to quantify the separation of the teat cup entry point from the position of said target teat, and to provide homing in information for said support on the basis of the amount of said separation.

Advantageously, the method also comprises the step:

to quantify said separation in steps defined by areas of said captured image.

Preferably, the method also comprises the step:

to guide the support to move the subimage of the captured image within the captured image to where the entry point for a supported teat cup is at the image position of the teat cup entry point for the selected teat cup.

Advantageously, the method also comprises the step:

to identify possible teat candidates as respective pixels which are adjacent and having a form and position appropriate to a teat illuminated with the light.

Preferably, the method also comprises the step:

to identify possible teat candidates by scanning the image in a succession of vertical scans to identify the brightest pixel in each scan Advantageously, the method also comprises the step:

to identify the brightest pixel from among a vertical line of pixels of differing brightness.

Preferably, the method also comprises the step:

to identify a possible teat candidate from said brightest pixels in adjacent scans which form a substantially horizontal line of length in a preselected range of pixels.

Advantageously, the method also comprises the steps:

to actuate a region containing said possible teat candidates with the aid of an actuating device, so as to bring at least one teat to movement, and to identify said at least one teat by establishing said movement.

The main advantage with this step is that the actuating step makes the teats moving, which makes it easier for the system to identify the teats. Another advantage with this step is that straws can be swept away resulting in the elimination of a source of error.

Preferably, the actuating step in a first embodiment, is performed by having said actuating device making physical contact with said teat candidates.

Advantageously, the actuating step in a second embodiment, is performed by having a fluid sprayed towards said teat candidates.

Preferably, the actuating device in a third embodiment, is performed by having both a fluid sprayed towards said teat candidates and said actuating device making physical contact with said teat candidates.

Advantageously, the identifying step is performed by identifying said at least one teat by establishing characteristic movement thereof.

This step makes it possible to distinguish a teat from a leg of a milk animal, which leg has another characteristic movement.

Preferably, the method also comprises the step:

to repeat the above mentioned steps, starting with the illuminating step, until each of all the teats of a milk animal have been selected as a target teat, and said support and any supported milking apparatus have been homed in to each of all the teats.

According to the invention, there is furthermore provided a milking apparatus support guide arrangement, characterized in that the support carries a source of a sheet of light positioned to pass no lower than a mouth of a teat cup arranged on said support and a video camera arranged to view through the sheet and over the mouth of the teat cup, wherein said source and video camera are arranged together to cooperate forwardly of the support, the video camera arranged to capture an image formed by said light forwardly of the support and provide an image signal, the arrangement further including image signal processing means to analyse said captured image signal and identify possible teat candidates as a target teat and to select one of said teat candidates as a target teat and to determine the position of said target teat to home in said support and any supported milking apparatus to said target teat. The main advantage of the arrangement according to the present invention is that it does not require the use of what is called historical data about the animals. The animals do not need to be placed in special stalls with tight constraints. They are free to move within the limits of the stall.

Advantageously, the image signal processing means includes means to select from the captured image signal a subimage including said target teat and analyse only said subimage, thereby reducing the time between successive processings of said subimage. Hereby, the speeding up of the arrangement is achieved.

Preferably, the image signal processing means provides, in said captured image, the position of a teat cup entry point for a target teat.

Advantageously, the image signal processing means includes means to quantify the spatial separation of the teat cup entry point from the position of said target teat and provide homing in information for said support on the basis of the amount of said separation.

Preferably, the homing in information causes more rapid movement of the support, the greater said spatial separation.

Advantageously, the arrangement also comprises an actuating device for actuating a region containing said possible teat candidates, so as to make at least one teat moving and a control means to identify said at least one teat by establishing the movement.

The main advantage is that it is easier for the system to identify the teats when they are moving, or after they have performed a movement. Another advantage is that straws can be swept away resulting in the elimination of a source of error.

Preferably, the actuating device is arranged on said support.

Advantageously, in another embodiment, the actuating device is arranged on a separate movable support.

Preferably, in another embodiment, the actuating device is arranged on the floor in a stall.

Advantageously, in another embodiment, the actuating device is arranged on a post of a stall.

Preferably, the actuating device is provided with spray-nozzles for spraying a fluid towards said teats.

Advantageously, said fluid is a liquid such as water.

Preferably, in another embodiment, said fluid is air.

Advantageously, said actuating device comprises two counter rotating brushes.

Preferably, in another embodiment, the actuating device is both provided with spray-nozzles for spraying fluid towards said teats and comprises two counter rotating brushes.

The location technique embodying the invention uses a laser to direct a generally horizontal sheet of light towards the teats of a milk animal. When viewed by eye, this laser light sheet will be seen as a bright, generally horizontal line across each teat in range of the sheet and other such lines on other parts of the animal, such as the legs, if these are in range of the sheet.

A video camera is directed towards the teats. The camera view axis may be in or above or below the sheet of light and is at an angle to the axis of the plane of the sheet. Conveniently, the camera looks upwardly through the sheet. The laser and camera are fixedly related to each other and move as a whole being mounted on a milking apparatus support.

The camera receives an image generally similar to that seen with the eye, but in monochrome. The image is then processed to recover the bright line that falls across each teat in view. (Note: the term image is used although in operation no image is displayed.) One teat from the image is chosen, conveniently the front right teat when a milking robot, for example as described in GB-A-2 258 382 approaches the udder from the right front of the animal and rearwardly of the animal towards the udder, and the laser and camera moved, under control of information derived from the image processing, to approach the chosen teat by movement towards the respective bright line image on the teat.

This technique reliably distinguishes one teat from another by relative positions in the image on known positions. Similarly it can distinguish teats from background objects such as a leg or a tail or part of a stall or even debris, such as straw or other vegetation that may be in the region of the teats, by size or shape or unrealistic positions. Also, the technique is relatively immune to stray light and different levels of ambient illumination because the line on a teat is distinguishably bright and of a known wavelength which may be specifically selected with an appropriate filter.

In one embodiment the laser and camera are mounted on a milking apparatus support in the form of the teat-cup-carrier of a milking robot so that the robot can be controlled to approach a chosen teat closely enough for a teat-cup or other apparatus on the carrier to be reliably applied to the chosen teat.

By repeated use of the technique on each remaining teat, a respective cup can be applied to each teat. Otherwise the position of the remaining teat or teats can be estimated from the established position of the chosen teat and stored information for the specific animal, including the milking history, for teat cup application without use of the technique once the first teat-cup has been successfully applied.

The use of the term milk animal in this application is intended to be any kind of milk animal, such as cows, sheep, goats, buffaloes, and horses.

DRAWING SUMMARY

Embodiments of the invention will now be described with reference to the accompanying drawings, in which:

FIG. 1 shows a schematic diagram of apparatus to form a teat-distinguishing image, FIG. 2 shows a block diagram of processing steps, FIG. 3 shows a block diagram of image processing hardware, FIG. 4 is a representation of the images captured by the camera, FIG. 5 is a flow chart of the control action, FIG. 6 shows three elevations of a mounting for a laser and a camera, FIG. 7 shows one example of the order in which the teats of a milk animal are selected, FIG. 8a illustrates a first embodiment of an actuating device, FIG. 8b illustrates a second embodiment of an actuating device, FIG. 8c illustrates a third embodiment of the actuating device, FIG. 9a is a representation, similar to FIG. 4, of the images captured by the camera for explaining the use of the actuating device in the arrangement, FIG. 9b is a representation, similar to FIGS. 4 and 9a, of the images captured by the camera for explaining the use of the actuating device in the arrangement, and FIG. 10 illustrates the movement of the teats achieved by the actuating device.

DETAILED DESCRIPTION OF PREFERRED EMBODIMENTS

A particular embodiment will now be described in more detail.

Figure 1:
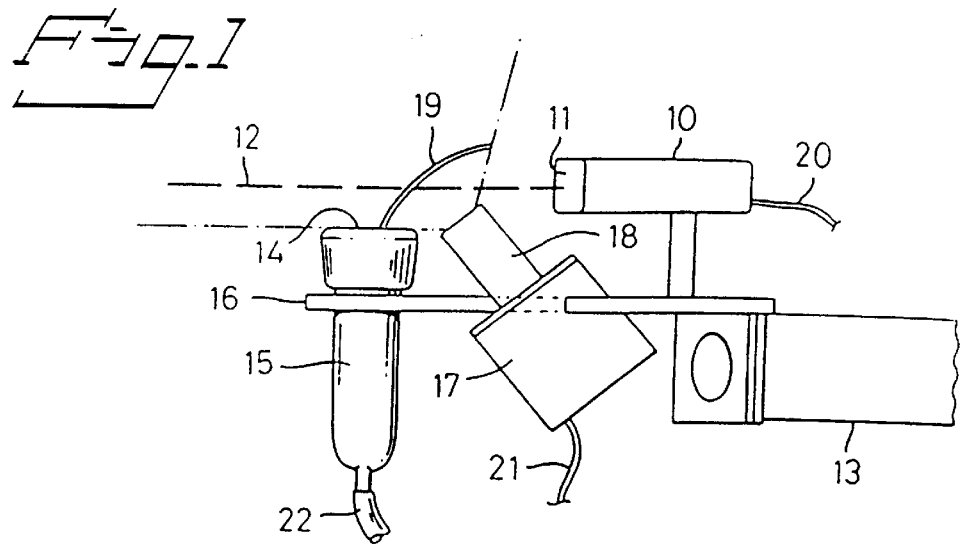

FIG. 1 shows a small laser 10 such as a 5 milliwatt device from the firm Vector Technology, England, fitted with a lens 11 to provide a light sheet 12 of an included angle of some 600 to 1000 with uniform illumination. Such a laser is a tube about 12 millimeters in diameter and 75 millimeters long with a fairly thin connection cable, so it is not a severe additional load for a teat cup carrier robot arm 13, even when mounted at the outer end of the robot arm. The laser 10 is positioned to direct the sheet of light 12 a small distance above the mouth 14 of a teat-cup 15 when in the carrier 16 of the robot arm.

A compact solid state camera 17 is also mounted on the teat cup carrier 16. This camera is a ½ inch (12 mm) charge coupled device camera fitted with a lens 18 to give a 90° angle of viewing in the vertical plane. The camera is a 90° angle of viewing in the vertical plane. The camera is positioned at an angle to the light sheet 12 so that one extreme of the angle of view is on or below the mouth of the teat cup 14, and therefore below the light sheet 12, while the other extreme is directed to the rear of a perpendicular to the plane of the light sheet. This positioning of the camera view angle assists in distinguishing between objects at different distances from the camera.

The video performance of the camera gives a resolution of approximately 400 by 400 pixels at a 25 Hz (40 milliseconds/frame) frame rate or 400 by 200 pixels at a 50 Hz (20 milliseconds/frame) frame rate. The 90° angle lens has a depth of field from 300 to 50 millimeters when back focussed with a small aperture (f16). For the camera described, this resolution is about 4 pixels/degree, approximately 1 millimeter resolution at 200 millimeter with a 450 millimeter field of view. A filter may be used on the camera to reduce the effect of ambient light at wavelengths other than that of the laser. Typically a 2% bandwidth filter is suitable.

A connection to energise the laser 10 is indicated at 20, signal and energisation connections for the camera 17 at 21, and the vacuum line for the teat-cup at 22. The robot arm 13 can be of the type shown in GB-PS-2 226 941 or GB-PS-2 258 382 or another suitable type. The control instructions for the robot arm are derived from the camera video information.

An exemplary technique for deriving the control instructions is now described. A single frame of video from the camera is "grabbed" as a monochrome image to be processed and read into a memory, each pixel in the image being represented as an eight bit value in a memory location, ranging in value from 0 (black) to 255 (white). Preferably a single field of video may be grabbed, and processed whilst the next field is being grabbed so allowing real time processing. A restricted area surrounding the teat image, for example 50 pixels horizontally and 10 pixels vertically, may be used to reduce the total pixels scanned to 500 instead of those for a full frame (up to 512×512, i.c. 262,144). The size of the restricted area is chosen to allow optimum tracking at a field rate of up to 50 fields/second. The average and variance of the pixel values are calculated and used to produce a threshold value of brightness for the image. With this information, allowance can be made for the effects of changes in background (ambient) illumination and the exposure level of the camera. All the pixels are compared to the threshold value. If all the pixels below the threshold are ignored, the remaining pixels should be those in the laser stripe. These remaining pixels are examined to determine whether there are horizontally adjacent pixels that are above the threshold. Tbose pixels that are above the threshold are grouped together into lines which are then represented in memory as a linked list. (These lines are not "lines" of the image). Lines below a chosen (small) length are discarded, providing a filtering of shortobjects or "glitches". Lines on successive rows of the image which overlap are grouped as blobs, those blobs with less than a chosen number of overlapping lines are discarded, and the retained blobs stored in a further linked list.

A "real" geometry is now applied to the stored blobs so that the X and Y value for each blob, and its size, are established. Now the blobs which are unlikely to indicate teats, because of size, position etc., can be discarded. Various rules can be produced and applied for this stage, having regard to those blobs which are too narrow or too wide or in the wrong area under the animal to be a teat.

A candidate teat is now identified from the teat images that have been selected by the above process. In one arrangement, the camera is positioned forward and on a level with a teat, analysis of the images allows correction of the camera image. Alternatively the camera approaches from the front of the udder rearwardly on the centre line while the camera is moving upwards until the teat images are seen, the teat images are approximately symmetrical about the centre line, and image analysis identifies the selected teat. Having identified the position of a specific teat, the position of the other teats are similarly identified by the images. Of course they may be found by comparing the teat images with a reference., such as a "model" of average relative teat positions based on a sample of real animals.

Figure 2:
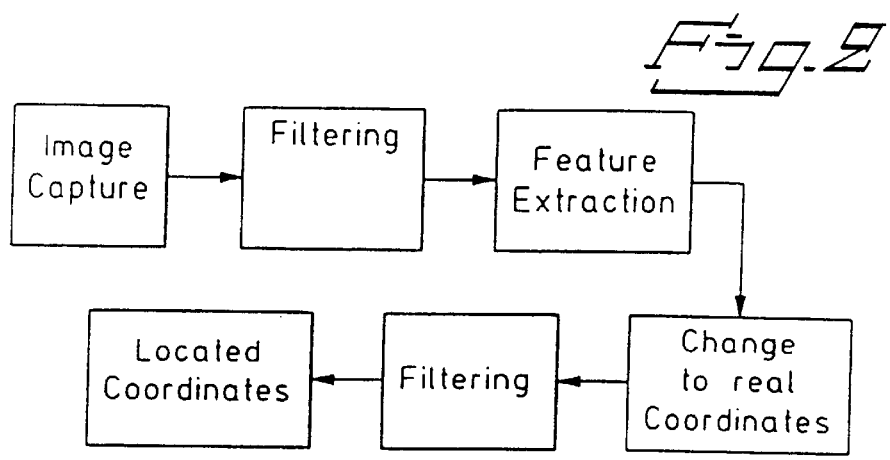

The software to achieve the above image processing is based on a mixture of proprietary and specially written routines. One arrangement of hardware is based on an ELTEC-68K system using an MC68020 processor. At 16 MHz with a 512×512 image array, an image can be processed in five seconds. This speed would only provide a rather slow teat application procedure while the whole image has to be processed, but faster processing is clearly possible with recent developments in computer speeds. Once only the restricted area has to be processed, the whole of this image area can be processed much more frequently. FIG. 2 shows in block diagram form the sequence of image processing steps, while FIG. 3 shows a block diagram of units of an image capture and processing arrangement.

Figure 3:
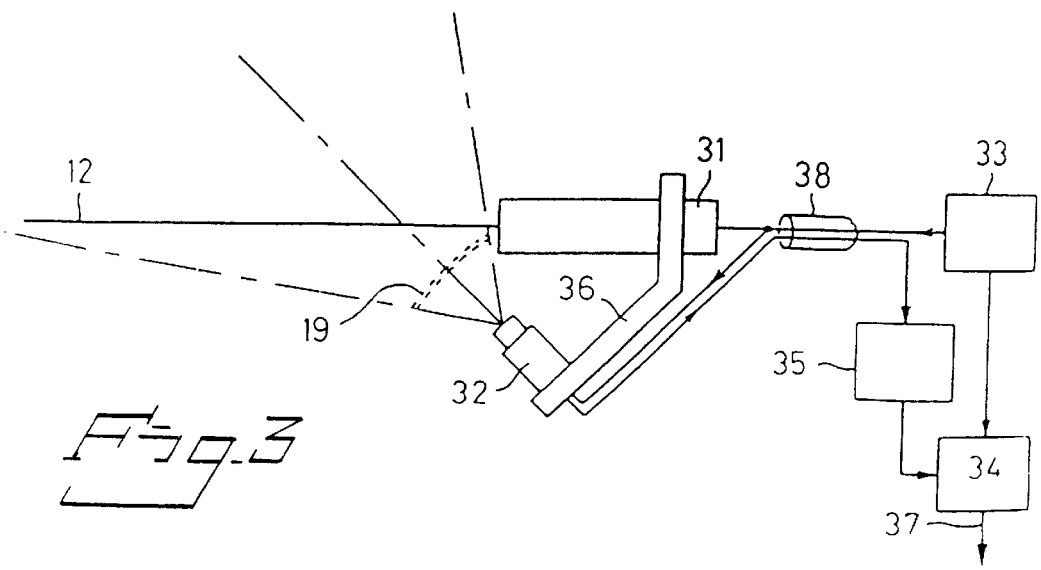

In FIG. 3, a laser stripe generator is indicated at 31, and a camera to view an image produced by the laser stripe is indicated at 32. Both are on the robot arm, part of which is shown at 36. A power supply unit 33 energises electronic circuit units 34 and 35 and camera 32, if needed. Unit 35 processes the image information from camera 32 and supplies image position information to unit 34 which provides control information at output 37 for the robot (not fully shown). Power and signal cables are held together 38 on the robot arm.

In order to produce a cost-effective technique for guiding a milking apparatus support towards a teat of a milk animal, the processing of the image received by the camera must be as efficient as possible. With unlimited computational power and speed, it would be possible to process a complete image quickly enough to produce guidance information for a robot operating the milking apparatus support to follow any teat movement in real time.

However such an arrangement is an extravagant use of resources and would greatly increase the cost and complexity of the equipment.

By way of an example of the invention, one technique for guidance employing the equipment such as that described above, which significantly reduces processing needs while still providing adequate real time guidance information for the robot, will now be described with reference to FIG. 4.

Consider the image 43 formed by the camera as the sheet of light from the support is moved by movement of the robot towards the expected general position of the udder and teats 44,45,56,58. In this example, the sheet is moved upwardly and rearwardly beneath the animal. Because of the geometry of the camera and light sheet, an object illuminated by the moving sheet will move more quickly up the image the nearer the object is to the camera. The image includes a notional fixed point 50 which represents a position just above the supported teat cup. The point 50 is fixed in position in the image 41, generally at its centre, because it is part of the "real" geometry of the laser, camera and teat cup support. The point 50 is conveniently the place at which a teat will enter a teat cup when the supported teat cup approaches from below, assisted if appropriate by the conventional vacuum. The extremes of the image 43 are not illuminated by the laser. Image portion 41 is the one defined by the "real" geometry as the expected place for a teat. The area of image 43 above image portion 41 is too near to include a teat, and that area below 41 is too far away to do so. The image portion 41 is geometrically linked to that of the support on the robot, and the region shown in the image changes with robot movement.

The image portion 41 is examined by scanning the image pixels in columns 40 between the top and bottom (or vice versa) of the image, across the image. The scanning is performed by moving the robot arm upwards and downwards. The laser and camera are being stationary arranged on said robot arm. The brightest pixel in each column is noted 47,48,49,57,59. When a group of such pixels side-by-side in adjacent columns and maintained in successive scans is found, this is considered as a possibility for the image of the light on the teat nearest the camera. (A single bright pixel is postulated for each column. In practice, a "stick" of a small number of pixels vertically adjacent in a column may be found whose brightness increases along the stick to a peak or plateau, which may be saturation, and then reduces. The peak or the middle of the plateau is taken as the significant pixel position.) The groups 48,49,57,59 would be identified as possible teat candidates, while the group 47 would be rejected as too large for a teat, arising from a leg 46. The group 49 would then be selected as a target teat, as being the nearest teat. Pixels representing reflections on hoses or parts of the stall could be rejected in a similar manner or by software techniques.

Once a suitable group 49 of bright side-by-side pixels has been identified as representing a teat of interest, a target teat 44, a subimage 42, some 30 by 100 pixels for example, of the image portion and which encloses the identified pixel group is defined, and only this sub-image is then scanned and processed to provide guidance information to the robot to move the supported teat cup, or other apparatus, towards the deduced position of the pixel group. This subimage 42 is within image portion 41 but not fixed in position within image portion 41. Consider the support, light source and camera moving through the region under the animal. Now consider the image portion 41. This will have at its centre, or some other known chosen point, the fixed point 50. Image portion 41 will also include sub-image 42 which includes the image of the teat of interest but probably does not include point 50. The guidance information is derived from the relative positions of point 50 and subimage 42 and more specifically the position of the centre of the teat image 49 therein. Thus, in successive images examined by the equipment, the effect of the guidance information will be to move the centre of the teat image towards the point 50. By limiting the scanning and processing to only the subimage, the response of the robot can be improved. Referring again to FIG. 4, the situation shown is the one just described, with the subimage 42, and thus the centre of teat image 49, at some distance from point 50. Notionally, image 41 has three distinct areas, 51, 52 and 53. Area 53 is the area immediately around point 50 and is indicated by boundary 55. Area 52 is around area 53 and is indicated by boundary 54. Area 51 is around area 52 and, as shown, is bounded by the edges of image 41. Of course more or fewer such areas can be used. The centre of image 49 is thus in the area 51, which is most remote from point 50. Accordingly, the guidance information for the robot derived from the subimage is provided at a high control gain so that the position of the robot is quickly corrected, towards the teat image centre, because the "error" is large. As the robot approaches the teat of interest by this continued correction, the teat image centre will move from area 51 into area 52, crossing boundary 54. Guidance information is now supplied at a lower control gain so that the robot approaches less quickly. When the teat image centre by continued correction enters area 53, the control gain and robot approach are further reduced. In this way, the tracking is adjusted to the approach of the robot to the teat of interest, so that the possibility of the robot "losing" the teat by "hunting" or overshoot is reduced. The fixed point 50 is actually associated with the robot arm, so when the robot arm is moving, the point 50 is also moving in the image portion 41. When e.g. the robot arm has moved towards the teat 44 the fixed point 50 will now be situated in the sub-image 42. conveniently, area 52 is sized by boundary 54, so point 50 is some 50 millimeters from the identified teat position. Area 53 is sized so that point 50 is some 20 millimeters from the identified teat position. The image 43 captured by the camera is 512 by 512 pixels or 256 by 512 pixels. Typically, the image portion 41 is 400 by 400 pixels respectively, processed at 25 frames per second, or 200 pixels wide by 400 pixels high, processed at 50 frames per second, and the subimage 42 is a total of 3000 pixels of suitable rectangular shape, such as 100 pixels wide by 30 pixels high, and processed at 40 or 50 frames per second. By using machine code for the image processing, the whole of the image portion 41 can be processed in 200 ms. This is fast enough to "capture" a possible teat image for the subimage. Also typically, a minimum of eight pixels side-by-side are considered appropriate for a group to be treated as a "possible" teat image. When the subimage is selected from the image, the repetition rate is increased and the subimage can be processed in seven milliseconds, which gives a repetition rate fast enough to track a teat when moved by normal animal movements. If required, a portion of image 41, intermediate portion 41, and subimage 42 can be processed as an intermediate step.

It is likely that the animal will move during the approach of the robot. It is estimated that the typical speed of movement of a teat will be some 100 millimeters per second unless a very violent movement occurs. If the movement is so violent that the teat image moves out of the image portion in use at the time, the approach procedure can be terminated either immediately or after a further period unless a suitable image is recaptured.

Similar techniques are usable for other milking apparatus such as teat cleaning and teat inspection deices.

FIG. 5 is a flow chart of the method of guiding milking apparatus support towards a teat of a milk animal according to the present invention. The method begins at block 70. At block 72, the method continues with moving said support to a fixed start position, without any reference to any animal. This fixed start position can be any suitable position, e.g. in a stable. This fixed position does not have any reference to, nor does it depend on the position of any animal. The method continues at block 74 with illuminating, by a sheet of light from the support, a region expected to contain at least one udder. The next step, at block 76, consists of capturing from said support images by viewing the region with a video camera. The method continues at block 78 with analysing said captured images in order to identify possible teat candidates (see FIG. 4; 44, 45,56,58). The next step, at block 80, consists of determining if any teat candidates have been found. If the answer is negative, i.e. no teat candidates have been found, the method continues at block 82 with moving the support and repeating the steps, starting with block 74. If, on the other hand, the answer is affirmative the method continues at block 84. This step consists of selecting one of said teat candidates as a target teat (see FIG. 4; 44). The method continues at block 86 with determining the position of said target teat. The next step, at block 88, consists of homing in said support and any supported milking apparatus to said target teat. The next step, at block 90, consists of determining if each of the four teats of a milk animal have been selected as a target teat and said support and any supported milking apparatus have been homed in to each of said four teats. If the answer is negative, the steps starting with block 74 are repeated. If, on the other hand, the answer is affirmative the method continues at block 92, where the method is completed.

FIG. 6 shows in views 6a rear elevation, 6b side elevation, 6c front elevation, a constructional arrangement of a mounting 60, by which a laser and camera can be mounted on a robot. A suitable camera is a Pacific Corporation type VPC 465, which is a 40 millimeter square unit in an aluminium housing about 5 millimeters thick, while the laser can be as described above or a semiconductor red laser which is smaller. Mounting 60 is a block in the form of a rectangular prism with part cut away to give an inlined face 61. The block is 60 millimeters square in plan and about 80 millimeters high. Face 61 is inclined at about 67° to the base. A bore 62 is parallel to base and emerges near the top of the face 61. Bore 62 is sized to receive the laser. An aperture 63 is provided to receive the camera clear of the laser. A bore 64 is provided for the camera connection. Conveniently, the block is of aluminium or a sufficiently rigid other light material, even a plastics material. Suitable tapped holes are provided for fastenings.

Figure 7:
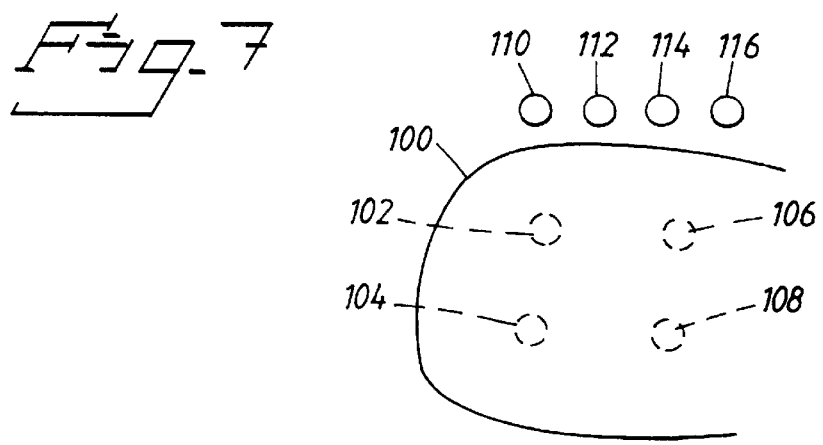

FIG. 7 shows one example of the order in which the teats of a milk animal 100 are selected. The milk animal 100 is only shown partially and schematically from above and only the rear part of the milk animal 100 is shown. The four teats 102, 104, 106, 108 of the milk animal 100 are also indicated in the figure. Schematically indicated in the figure are also four teat cups 110, 112, 114, 116 arranged in a row alongside of said milk animal 100. Assume that the robot arm with said support (see FIG. 1) is situated alongside of said milk animal 100 but at the opposite side in relation to the four teat cups 110, 112, 114, 116. The robot arm starts e.g. by fetching teat cup 110 and aplying it on the teat 102. Then the robot arm fetches the teat cup 112 and applies it on the teat 104 and then continues with applying the teat cup 114 on the teat 106 and finally applies the teat cup 116 on the teat 108.

It is obvious that the robot arm and the four teat cups can be situated in many other ways. The most important thing is that the order in which the teats of the milk animal are selected is performed in such a way that already applied teat cups do not interfere with the application of the rest of the teat cups.

Figure 8A:
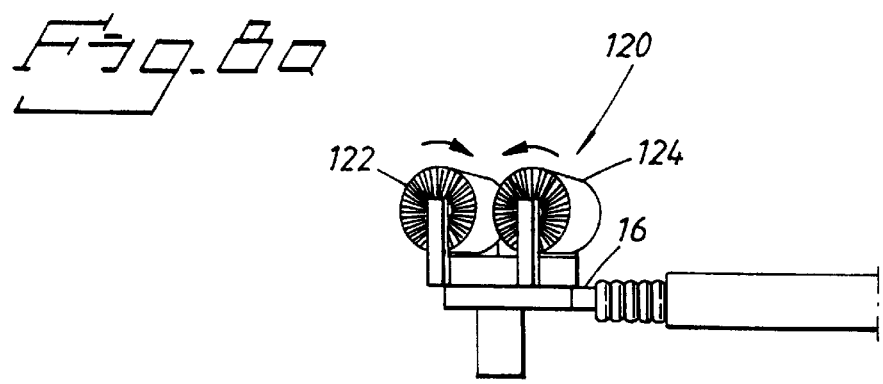

FIG. 8a, illustrates a first embodiment of an actuating device 120 for actuating a region containing said possible teat candidates, so as to bring at least the teats to movement. In the illustrated embodiment the actuating device 120 is arranged on a robot arm separate from the robot arm 13 (see FIG. 1) carrying the teat cup. This actuating device 120 comprises two counter rotating brushes 122, 124, between which the teat is intended to be inserted.

Figure 8B:
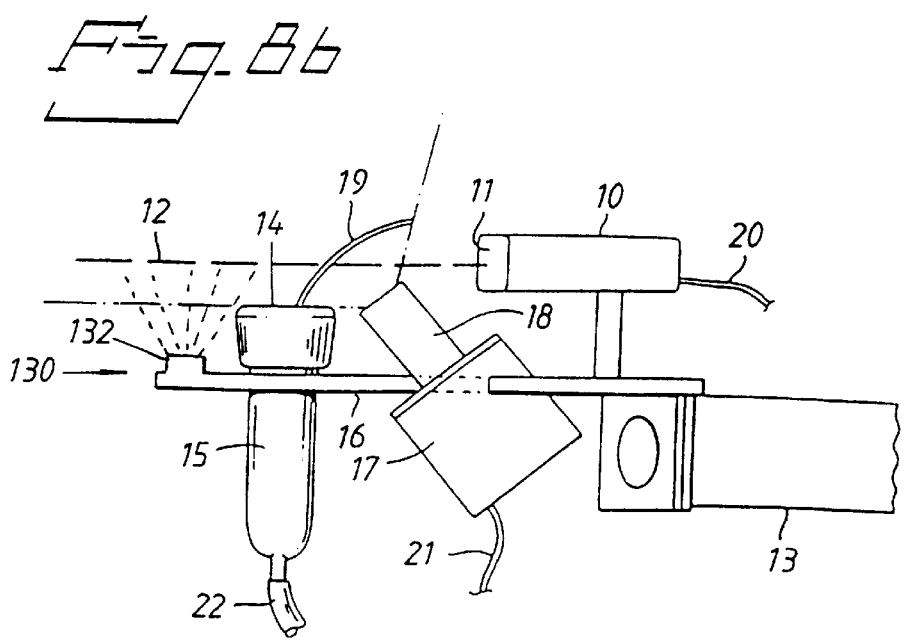

FIG. 8b, illustrates a second embodiment of the actuating device 130 for actuating a region containing said possible teat candidates, so as to bring at least the teats to movement. In this embodiment the actuating device 130 is arranged on the carrier 16 of the robot arm 13 carrying the teat cup 14. This actuating device 130 is provided with a plurality of spray-nozzles 132 (only one spray-nozzle is illustrated) for spraying a fluid towards said teats. The fluid can either be a liquid, e.g. water, or a gas medium, e.g. air.

Figure 8C:
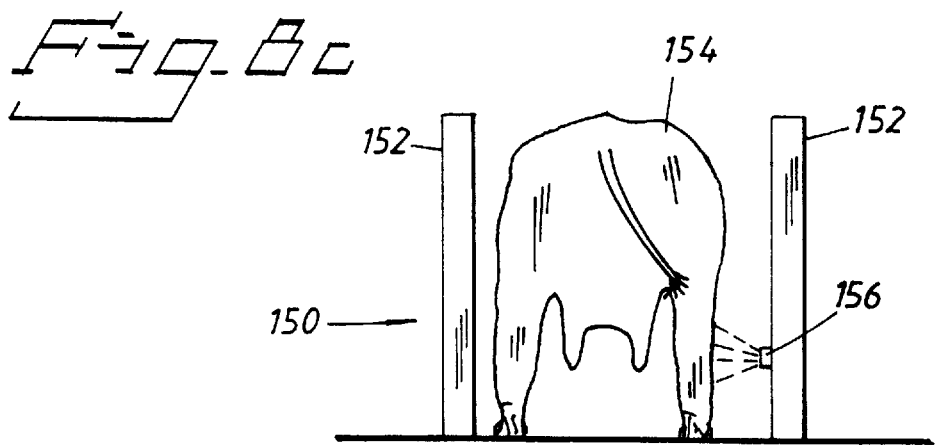

FIG. 8c, illustrates a third embodiment of the actuating device 150 for actuating a region containing said possible teat candidates, so as to bring at least the teats to movement. In this embodiment the actuating device 150 is arranged on a post 152 of a stall, containing a cow 154. This actuating device 150 is provided with a plurality of spray--nozzles 156 (only one spray-nozzle is illustrated) for spraying a fluid towards said teats. The fluid can either be a liquid, e.g water, or a gas medium, e.g. air.

The actuating device can also be a combination of the above disclosed embodiments, i.e. the actuating device can be provided with a plurality of spray-nozzles and two counter rotating brushes for spraying liquid and/or gas towards the teats and mechanically moving and cleaning the teats.

In the embodiments disclosed in FIGS. 8a–c, the actuating device 120;130;150 is arranged on a robot arm separate from the robot arm 13 (see FIG. 1) carrying the teat cup; on the carrier 16 of the robot arm 13 carrying the teat cup 14; or on a post 152 of a stall. Obviously the actuating device 120;130;150 can be arranged on the floor in the stall.

The main advantage of using an actuating device in accordance with the description above is that it is easier to identify the teats while they are moving, or after they have performed a movement. It is easier to distinguish them from other sources of error such as the animal's legs and equipment in the stall. Another advantage is that straws can be swept away resulting in the elimination of a source of error.

Figure 9A:
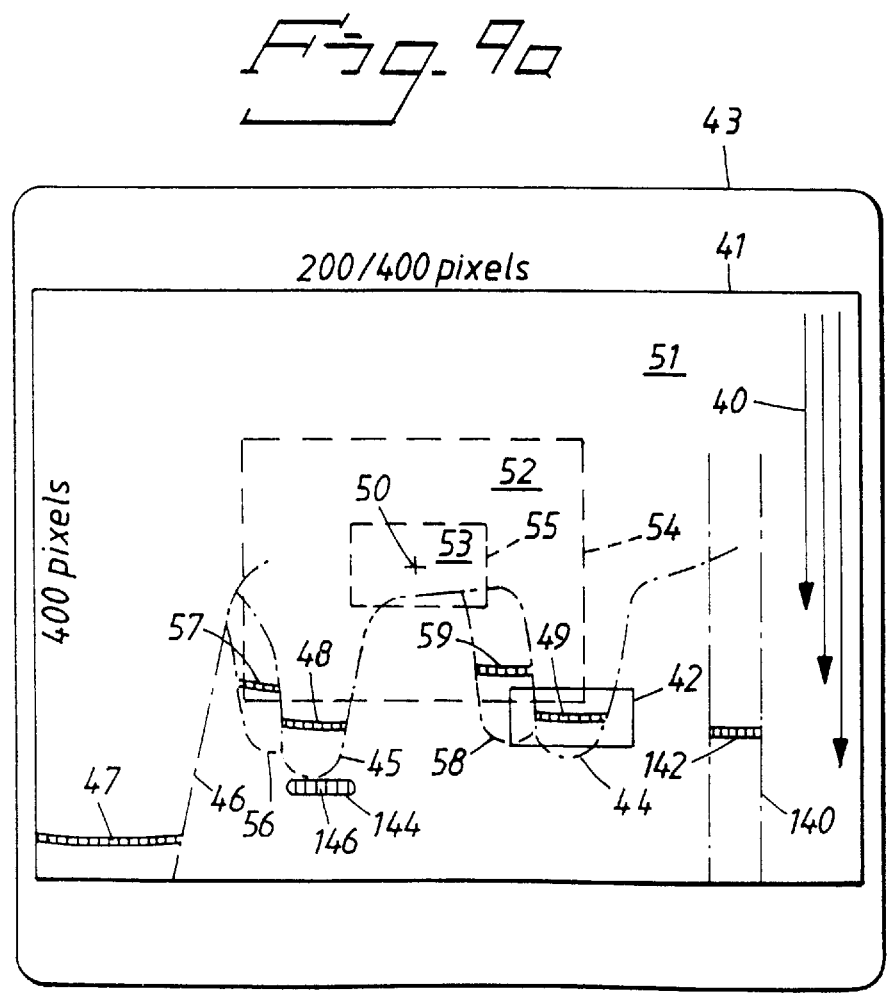

FIG. 9a is a representation, similar to FIG. 4, of the images captured by the camera for explaining the use of the actuating device in the arrangement according to the invention. As is apparent FIG. 9a is similar to FIG. 4 and like reference numerals designate like structural elements. Accordingly, the descriptive part corresponding to FIG. 4 will not be repeated again. Consider the image 43 formed by the camera, as the sheet of light from the support is moved by movement of the robot towards the expected general position of the udder and teats 44, 45, 56, 58. The image portion 41 is examined by scanning the image pixels 40 between the top and bottom of the image, across the image. The brightest pixel in each column is noted 47, 49, 57, 59, 142, 146. When a group of such pixels side-by-side in adjacent columns and maintained in successive scans is found, this is considered as a possibility for the image of the light on the teat nearest the camera. In the worst case, the groups 47, 49, 57, 59, 142, 146 would be identified as possible teat candidates. In this example the groups 49, 57, 59 arises from the teats 45, 56, 58, the group 47 arises from a leg 46, the group 142 arises from a post 140 in the stall and the group 146 arises from a straw 144. This means that the system can miss the teat 44, because the straw 144 is identified as a teat candidate. In this situauion a control means sends a signal to the actuating device 120;130, whereby the actuating device 120;130 moves towards the region containing the seven teat candidates. Assume, e.g., that the actuating device 120 comprises two counter rotating brushes 122, 124 (see FIG. 8a). When the actuating device comes into contact with the post 140, the post 140 will not move, and consequently the group 142 will not move. The group 146 will disappear if the straw 144 comes off the teat 45 when the actuating device 120 comes into contact with the teat 45 and the straw 144. When the straw 144 comes off the teat 45 the system will capture the group 48' as a possible teat candidate. When the actuating device 120 actuates the teats 44, 45, 56, 58 they will start moving. They are identified as teats by establishing said movement.

In another embodiment of the invention the teats are identified by establishing characteristic movement thereof. The teats are moving in a characteristic way, i.e. with a frequency within an interval of identification for teats in general. This means that the groups 48, 49, 57, 59 also will move in this characteristic way. When the actuating device 120 actuates the leg 46, the leg 46 or rather the group 47 will not move, but if it moves, the group 47 arising from the leg 46 will be moving with another "frequency" or another movement pattern than the groups 44, 45, 56, 58.

Figure 9B:
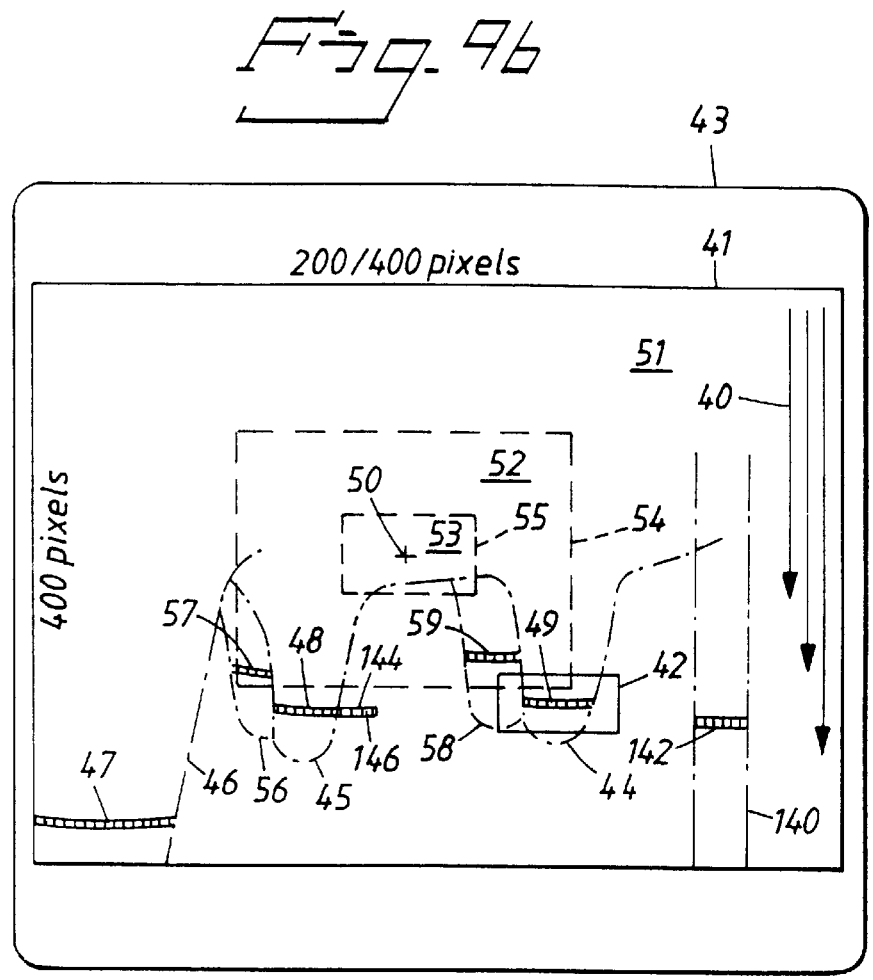

FIG. 9b is a representation of the images captured by the camera for explaining the use of the actuating device in the arrangement according to the invention. As is apparent FIG. 9b is similar to FIGS. 4 and 9a and like reference numerals designate like structural elements. In this figure a straw 144 is situated on the teat 45 so the group 146 will be rather broad. In the worst case the group 146 will be interpreted as too large for a teat. Again the actuating device will sweep away the straw 144 and the system will identify the teat 45 as described above.

Figure 10:
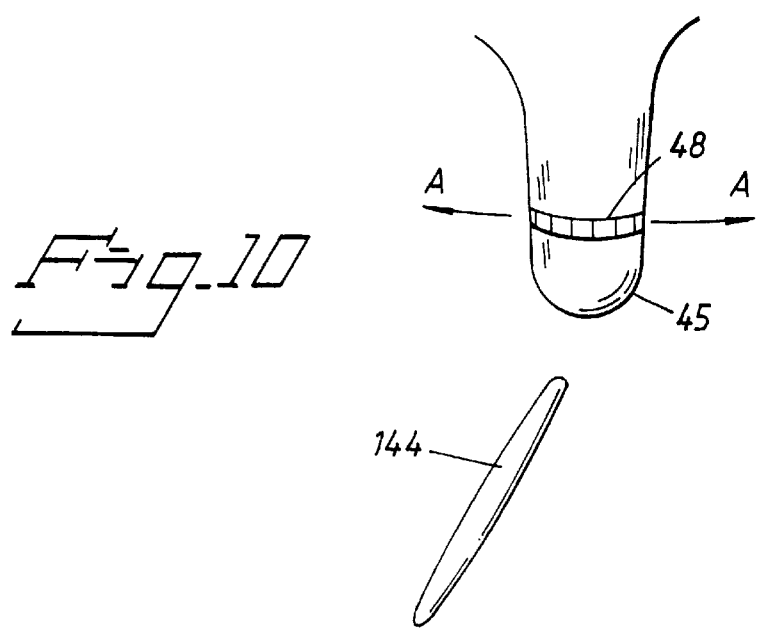

FIG. 10 illustrates the movement of the teats achieved by the actuating device. For the reason of simplicity only one teat 45 is shown. The situation shown is just after the actuating device 120;130 has actuated the teat 45 and the straw 144. The straw 144 has disappeared from the teat 45 and the teat 45 will be moving forth and back in accordance with the arrows A, with a characteristic frequency. The control means can now distinguish the teats among all the teat candidates.

The above techniques provide an effective and efficient arrangement for the application of milking apparatus to a milk animal.

We claim:

1. A method of guiding a milking apparatus support (16) towards at least one teat of a milk animal, comprising the following steps:

A. moving said support (16) to a start position,

B. illuminating (10,11) with a sheet of light (12) from the support (16) a region expected to contain at least one udder, C. capturing from said support (16) images (41) by viewing the region with a video camera (17), D. analyzing said captured images (41) to identify possible teat candidates (44, 45, 56, 58), E. selecting one of said teat candidates (44, 45, 56, 58) as a target teat (44), F. determining the position of said target teat (44), G. providing in said captured images (41) the position (50) of a teat cup entry point for a target teat (44), H. quantifying the separation of the teat cup entry point from the position of said target teat (44), I. quantifying said separation in steps defined by areas (51, 52, 53) of said captured images, J. providing homing in information for said support (16) on the basis of the amount of said separation, and K. homing in said support (16) and any supported milking apparatus (15) to said target teat (44).

2. The method according to claim 1, wherein the method, subsequently to selecting a target teat (44), comprises the additional step of:

L. analyzing only a subimage (42) of said captured images (41), which subimage (42) includes said target teat (44).

3. The method according to claim 2, wherein the method also comprises the following step:

M. guiding the support (16) to move the subimage (42) of the captured images (41) within the captured images (41) to where the entry point for a supported teat cup (15) is at the image position (50) of the teat cup entry point for the selected teat cup (15).

4. The method according to claim 3, wherein the method also comprises the following step:

N. identifying possible teat candidates (44, 45, 56, 58) as respective pixels which are adjacent and having a form and position appropriate to a teat (44) illuminated by the light (12).

5. The method according to claim 4, wherein the method also comprises the following step:

O. identifying possible teat candidates (44, 45, 56, 58) by scanning the images (41) in a succession of vertical scans (40) to identify the brightest pixel in each scan.

6. The method according to claim 5, wherein the method also comprises the following step:

P. identifying the brightest pixel from among a vertical line of pixels of differing brightness.

7. The method according to claim 6, wherein the method also comprises the following step:

Q. identifying a possible teat candidate (44, 45, 56, 58) from said brightest pixels in adjacent scans which form a substantially horizontal line of length in a preselected range of pixels.

8. The method according to claim 6, wherein the method also comprises the following step:

N. repeating the above mentioned steps, starting with the illuminating step, until each of all the teats of a milk animal have been selected as a target teat (44) and said support (16) and any supported milking apparatus (15) have been homed in to each of all the teats.

9. The method according to claim 1, wherein the method also comprises the following step:

L. actuating a region containing said possible teat candidates with the aid of an actuating device (120; 130; 150), so as to bring at least one teat to movement, and M. identifying said at least one teat by establishing said movement.

10. The method according to claim 9 wherein said actuating step is performed by having said actuating device (120) making physical contact with said teat candidates.

11. The method according to claim 9, wherein said actuating step is performed by having a fluid sprayed towards said teat candidates.

12. The method according to claim 9, wherein said actuating step is performed by having both a fluid sprayed towards said teat candidates and said actuating device (120) making physical contact with said teat candidates.

13. The method according to claim 9, wherein said identifying step is performed by identifying said at least one teat by establishing characteristic movement thereof.

14. The method according to claim 9, wherein said movement of at least one teat is performed by moving said support (16) to a fixed start position within a stall, without any reference to an animal.

15. The method according to claim 1, wherein said support (16) has a fixed start position within a stall without any reference to an animal.

16. A milking apparatus support (16) guide arrangement, comprising a support (16) which carries a source (10, 11) of a sheet of light (12), positioned to pass no lower than the mouth (14) of a teat cup (15) arranged on said support (16), and a video camera (1 7) arranged to view through the sheet and over the mouth of the teat cup (15), wherein said support (16) has a start position, wherein said source (10, 11) and video camera (17) are together arranged to cooperate (12, 19) forwardly of the support (16), the video camera (17) arranged to capture an image (41) formed by said light (12) forwardly of the support (16) and provide an image signal, the arrangement further including image signal processing means (35) to analyze said captured image signal and identify possible teat candidates (44, 45, 56, 58), to select one of said teat candidates (44, 45, 56, 58) as a target teat (44), to determine the position of said target teat (44), to provide in said captured image (41) the position (50) of a teat cup entry point for a target teat (44), wherein the image signal processing means (35) includes means to quantify the spatial separation of the teat cup entry point from the position of said target teat (44), to quantify said separation in steps defined by areas (51, 52, 53) of said captured image, and provide homing in information for said support (16) on the basis of the amount of said separation, and wherein the image signal processing means (35) home in said support (16) and any supported milking apparatus (15) to said target teat (44).

17. The arrangement according to claim 16, wherein the image signal processing means (35) includes means to select from the captured image signal (41) a subimage (42) including said target teat (44) and analyze only said subimage (42), thereby reducing the time between successive processing of said subimage (42).

18. The arrangement according to claim 17, wherein the homing in information causes more rapid movement of the support (16) the greater said spatial separation.

19. The arrangement according to claim 17, wherein the arrangement also comprises an actuating device (120; 130; 150;) for actuating a region containing said possible teat candidates, so as to make at least one teat moving, and a control means to identify said at least one teat by establishing the movement.

20. The arrangement according to claim 19, wherein said actuating device (120; 130) is arranged on said support (16).

21. The arrangement according to claim 19, wherein said actuating device (120; 130) is arranged on a separate moveable support.

22. The arrangement according to claim 19, wherein said actuating device (120; 130) is arranged on the floor in a stall.

23. The arrangement according to claim 19, wherein said actuating device (120; 150) is arranged on a post of a stall.

24. The arrangement according to claim 19, wherein said actuating device (130; 150) is provided with spray-nozzles (132; 156) for spraying a fluid towards said teats.

25. The arrangement according to claim 24, wherein said fluid is a liquid, such as water.

26. The arrangement according to claim 24, wherein said fluid is air.

27. The arrangement according to claim 19, wherein said actuating device (120) comprises two counter rotating brushes (122; 124).

28. The arrangement according to claim 19, wherein said actuating device is provided with spray-nozzles for spraying fluid towards said teats and two counter rotating brushes.

* * * * *